United States Patent
Li

(10) Patent No.: US 10,306,142 B2
(45) Date of Patent: May 28, 2019

(54) HEADSET

(71) Applicant: Wenjie Li, Guangzhou (CN)

(72) Inventor: Wenjie Li, Guangzhou (CN)

(73) Assignee: Sysmax Communication Technology Co., Ltd., Guangzhou, Guangdong Province ( * ) Notice: Subject to any disclaimer, the term of this patent is extended or adjusted under 35 U.S.C. 154(b) by 0 days.

(21) Appl. No.: 15/691,726

(22) Filed: Aug. 30, 2017

(65) Prior Publication Data

US 2018/0270415 A1  Sep. 20, 2018

(30) Foreign Application Priority Data

Mar. 16, 2017  (CN) .......................... 2017 1 0156840

(51) Int. Cl.
*H04N 5/232* (2006.01)
*H04N 13/344* (2018.01)
*H04N 5/225* (2006.01)

(52) U.S. Cl.
CPC ....... *H04N 5/23238* (2013.01); *H04N 5/2251* (2013.01); *H04N 5/2254* (2013.01); *H04N 13/344* (2018.05)

(58) Field of Classification Search
CPC ........... H04N 21/21805; H04N 5/2252; H04N 5/2258; H04N 5/2254; H04N 5/23238; H04N 13/344
See application file for complete search history.

(56) References Cited

U.S. PATENT DOCUMENTS 8,483,401 B2  7/2013  Sampimon et al.
9,479,732 B1  10/2016  Saleh et al.
(Continued)

FOREIGN PATENT DOCUMENTS

CN    202815718 U   3/2013
CN    103442195 A   12/2013
(Continued)

OTHER PUBLICATIONS

State Intellectual Property Office of the People's Republic of China (ISR/CN), "International Search Report for PCT/CN2017/088363", China, dated Jun. 15, 2017.
(Continued)

*Primary Examiner* — Obafemi O Sosanya
(74) *Attorney, Agent, or Firm* — Shuang Chang; PSK Intellectual Property Group, LLC

(57) ABSTRACT

A headset for panoramic photography, including a left receiver body and a right receiver body for being mounted on the left ear and the right ear of a user. A side of the left receiver body away from the left ear of a user is provided with a left camera, and a side of the right receiver body away from the right ear of the user is provided with a right camera. The cameras are ultra-wide-angle with a field angle of at least 180°, and optical axes of the cameras are perpendicular to optical axes of eyes of the user. User can listen, speak, and shoot photos or videos without hand-holding the camera. By shooting within a field angle of 180° at the left and right sides of a human body, a 360° panoramic image is obtained by merging the acquired images, thus produces simulated images and Virtual Reality environment.

12 Claims, 5 Drawing Sheets

(56) References Cited

U.S. PATENT DOCUMENTS

| | | | | |
|---|---|---|---|---|
| 2014/0036127 A1* | 2/2014 | Pong | ............... | H04R 1/028 |
| | | | | 348/333.01 |
| 2016/0259410 A1* | 9/2016 | Moore | ............... | G06F 3/016 |
| 2016/0299569 A1* | 10/2016 | Fisher | ............... | G02B 27/017 |
| 2017/0064430 A1* | 3/2017 | Zheng | ............... | H04R 1/1041 |

FOREIGN PATENT DOCUMENTS

| | | |
|---|---|---|
| CN | 105027206 A | 11/2015 |
| CN | 105657594 A | 6/2016 |
| WO | 2014019533 A1 | 2/2014 |
| WO | 2017040633 A1 | 3/2017 |

OTHER PUBLICATIONS

State Intellectual Property Office of the People's Republic of China (ISR/CN), "Written Opinion of the International Searching Authority for PCT/CN2017/088363", China, dated Jun. 15, 2017.

European Patent Office, "European Search Report and Opinion", EU, dated Dec. 19, 2017.

\* cited by examiner

HEADSET

CROSS-REFERENCE TO RELATED APPLICATION

This non-provisional application claims priority under 35 U.S.C. § 119(a) on Patent Application No. 201710156840.0, filed in P.R. China on Mar. 16, 2017, the entire contents of which are hereby incorporated by reference as if fully set forth herein.

FIELD OF THE INVENTION

The present invention relates generally to the field of audio and video technologies, and particularly to a headset.

BACKGROUND OF THE INVENTION

With the development of the information technologies, the Virtual Reality (VR) technology is quickly spread in the fields such as video, game, picture, shopping, etc. as a computer simulation technology that enables creation and experience of the virtual world. The VR technology acquires and fuses perceptual information such as visual information, auditory information, tactile information, force information, motion information, etc. to generate a three-dimensional dynamic virtual scene and an interactive system simulation for entity behavior using computer, so that the user can be immersed into the environment.

Image information is an important component of the VR perceptual information. However, as a traditional image acquiring product, the existed ordinary camera merely acquires image information within a very limited angle range, and cannot serve as a VR image acquiring device. In recent years, some companies in the industry started researches on the panoramic camera, and several types of panoramic cameras have been launched on the market. However, the existed panoramic cameras have large volumes and should be intentionally hand-held for shooting, which is inconvenient.

A headset is a necessity in the lives of the modern young people. Whether being on the way between home and office, or in the scenes of tourism, indoor reading, etc., the young people like to wear headsets to enjoy lives while listening to the music. However, the headsets on the market have simplex functions, and usually can only play the music or answer a phone, without a function of panoramic photography, thus cannot acquire the things, persons or scenes seen by the people to fabricate the VR environment.

SUMMARY OF THE INVENTION

In view of this, an objective of the present disclosure is to provide a headset for panoramic photography, which can conveniently shoot images or videos of the scenes of the user's daily behaviors and activities without being hand-held, and provide 360° panoramic images for the VR.

According to an aspect of the present disclosure, there is provided a headset for panoramic photography, comprising a left receiver body and a right receiver body for being mounted on the left ear and the right ear of a user; a side of the left receiver body away from the left ear of the user is provided with a left camera, and a side of the right receiver body away from the right ear of the user is provided with a right camera; the left camera and the right camera are ultra-wide-angle cameras with a field angle of at least 180°, and optical axes of the left camera and the right camera are perpendicular to optical axes of eyes of the user.

Further, the left camera and the right camera are fish-eye cameras having fish-eye lenses.

Further, the left receiver body and the right receiver body are provided therein with a speaker, respectively.

Further, a microphone is provided on the left receiver body, the right receiver body or the headset wire.

Further, a microphone is provided on the left receiver body and the right receiver body, respectively. By providing two microphones, an environmental acoustic transmission effect can be achieved and the background sound can be eliminated.

Further, the headset may comprise a headset wire provided with a button controller; the button controller comprises a button controller case, a control panel, and a button connected to the control panel and embedded into the button controller case; the control panel at least controls shooting operations of the left camera and the right camera through the button.

Further, the headset may further comprise a processor that comprises a central control module and a shooting control module; a first signal end of the central control module is connected to an output end of the button through the headset wire; a second signal end of the central control module is connected to a first signal end of the shooting control module; a second signal end of the shooting control module is connected to the left camera and the right camera through the headset wire, respectively; after receiving a short-press signal from the button, the central control module controls the left camera and the right camera to shoot images through the shooting control module; after receiving a long-press signal from the button, the central control module controls the left camera and the right camera to shoot videos through the shooting control module.

Further, the processor may further comprise a sound card module; a third signal end of the central control module is connected to a first signal end of the sound card module; a second signal end of the sound card module is connected to speakers of the headset through the headset wire, respectively; a third signal end of the sound card module is connected to a microphone of the headset through the headset wire; the sound card module transmits a voice signal from the central control module to the speakers of the headset, while transmitting voice signals output from the microphones to the central control module.

Further, the headset may be a wireless headset that may further comprise a communication module configured to communicate with an external device, and transmit data of images shot by the left camera and the right camera to the external device. Preferably, the communication module may comprise a Bluetooth communication module and/or a Wi-Fi communication module.

Further, the headset may further comprise at least one control button configured to control shooting operations of the left camera and the right camera.

Further, the headset may further comprise a power supply module configured to at least supply power to the left camera and the right camera.

Further, the headset may further comprise a storage card configured to store data of images shot by the left camera and the right camera. Further, the headset may further comprise a storage card interface configured to receive the storage card.

As compared with the prior art, the embodiment of the present disclosure provides ultra-wide-angle cameras on the headset, so that the user can easily shoot scenes needing to be shot in the daily behaviors and activities just by wearing the headset. Thus, the user not only listens and speaks with the headset, but also quickly and conveniently shoots images or videos without hand-holding the camera. Further, by shooting within a field angle of 180° at the left and right sides of the human body through the left and right cameras, a 360° panoramic image is obtained by merging the images acquired at the left and right sides within the field angle of 180°, thus provides to the user simulated images and VR environment.

Features that are described and/or illustrated with respect to one embodiment may be used in the same or similar way in one or more other embodiments, and/or used in combination with or in substitution for the features of other embodiments.

It should be emphasized that the term "comprise/include/have" herein is used to specify the presence of features, steps or components, without excluding the presence or addition of one or more other features, steps, components or combinations thereof.

Many aspects of the present disclosure will be better understood with reference to the following drawings. The constituent parts in the drawings are not surely drafted in proportion, but for more clearly illustrating the principle of the present disclosure. For the convenience of illustrating and describing some portions of the present disclosure, and improving understanding of the present disclosure, certain portions in the drawings may be enlarged, i.e., being larger than other portions in an exemplary device practically manufactured according to the present disclosure. Elements and features illustrated in one drawing or embodiment of the present disclosure may be combined with elements and features illustrated in one or more other drawings or embodiments.

DETAILED DESCRIPTION OF THE INVENTION

In order to better understand and implement the present disclosure, the embodiments of the present disclosure will be described in detail as follows with reference to the drawings.

It should be noted that in order to avoid the present disclosure from being vague due to unnecessary details, the drawings only illustrate device structures closely related to the solutions according to the present disclosure, while omitting other details well known by persons skilled in the art and not so closely related to the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise.

Figure 1:
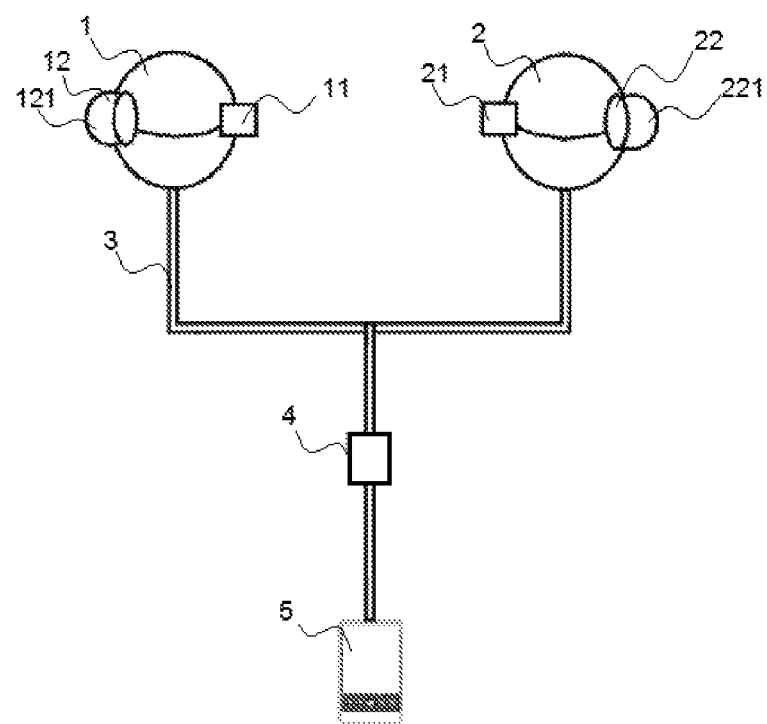
FIG. 1 illustrates a structure of a wired headset for panoramic photography in an embodiment of the present disclosure.

Referring to FIG. 1, which illustrates a structure of a headset for panoramic photography in an embodiment of the present disclosure, wherein the headset for panoramic photography is a wired headset, comprising: a left receiver body 1, a right receiver body 2, a headset wire 3 and a button controller 4. The left receiver body 1 and the right receiver body 2 are connected to the button controller 4 through the headset wire 3, respectively. A tail end of the headset wire 3 is provided with a headset connector, through which a connection to an external device 5 is allowable. The external device 5 may be an electronic device such as, but not limited to, a smart phone, a tablet computer, a notebook computer and/or a desktop computer.

Figure 4:
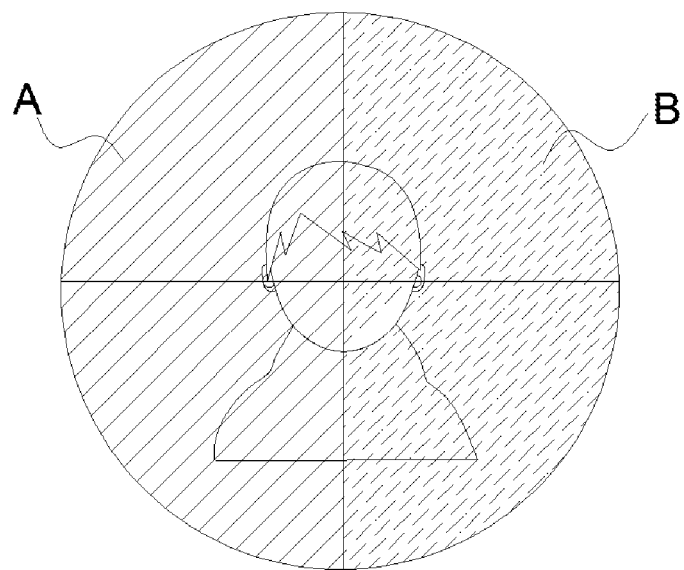
FIG. 4 illustrates a photography area of a headset for panoramic photography in an embodiment of the present disclosure.

A side of the left receiver body 1 facing the left ear is provided with a left play port 11, and a side of the left receiver body 1 away from the left play port 11 is provided with a left camera 12 that is preferably an ultra-wide-angle camera with a field angle of 180° or more to shoot static images or dynamic images (i.e., video) within at least 180° field angle at the left side of the user (area A as illustrated in FIG. 4). A side of the right receiver body 2 facing the right ear is provided with a right play port 21, and a side of the right receiver body 2 away from the right play port 21 is provided with a right camera 22 that is preferably an ultra-wide-angle camera with a field angle of 180° or more to shoot static images or dynamic images (i.e., video) within at least 180° field angle at the right side of the user (area B as illustrated in FIG. 4).

In this embodiment, one side of a receiver body close to the head of the user who wears the headset is defined as an inner side, and the other side is defined as an outer side. Thus the left play port 11 and the right play port 21 are located at the inner sides of the left receiver body 1 and the right receiver body 2, respectively, and the left camera 12 and the right camera 22 are located at the outer sides of the left receiver body 1 and the right receiver body 2, respectively. The left play port in the left receiver body 1 is provided with a left speaker (not shown), and the right play port in the right receiver body 2 is provided with a right speaker (not shown).

In one embodiment, the headset wire 3 of the headset may be provided with a microphone (not shown), through which sounds can be inputted. In another embodiment, the microphone may be provided on the receiver body of either of the left receiver body 1 and the right receiver body 2.

In another embodiment of the present disclosure, each of the left receiver body 1 and the right receiver body 2 may be provided with a microphone. Namely in this embodiment, the left receiver body 1 is provided with a left microphone, and the right receiver body 2 is provided with a right microphone. Preferably, the left microphone and the right microphone may be provided as being symmetrical to each other. Providing of microphones on both sides (the two receiver bodies) of the headset can achieve an acoustic transmission effect and eliminate the noise and the background sound. When the user wears an ordinary headset, it may be uneasy to hear the external sounds. However, if the left and right receiver bodies are each provided with a microphone, the sounds acquired by the microphones can be directly transmitted to the ears, so as to achieve an environmental acoustic transmission effect and eliminate the background sound.

Figure 5:
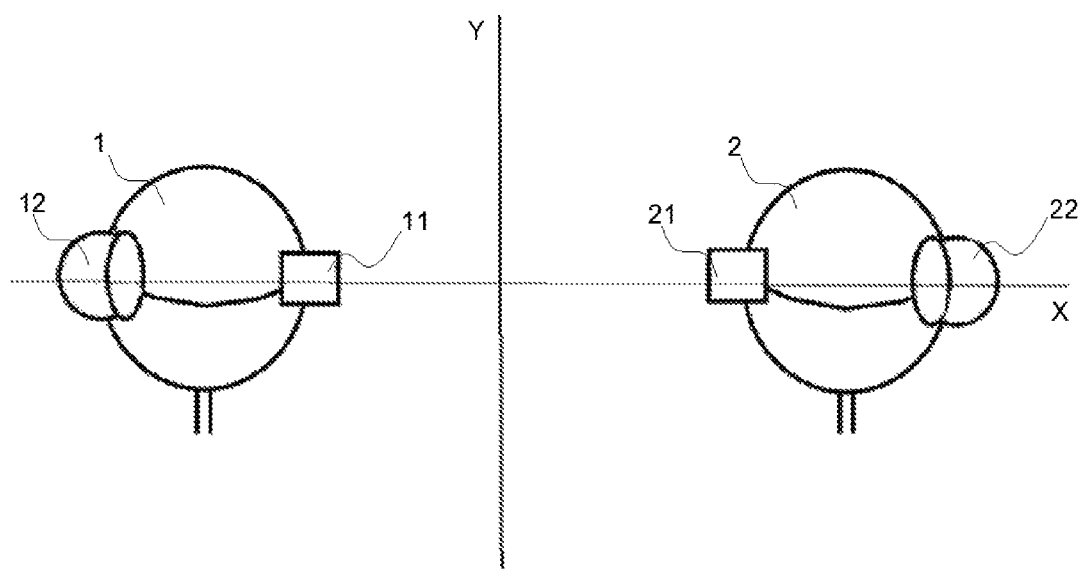
FIG. 5 illustrates a setting position of a headset for panoramic photography in an embodiment of the present disclosure.

In one embodiment of the present disclosure, the ultra-wide-angle cameras (the left camera 12 and the right camera 22) provided on the left receiver body 1 and the right receiver body 2 are fish-eye cameras which employ fish-eye lenses. In the embodiment as illustrated in FIG. 1, the left camera 12 is embedded in an outer side of the left receiver body 1, and the left fish-eye lens 121 is exposed on the left receiver body 1; the right camera 22 is embedded in an outer side of the right receiver body 2, and the right fish-eye lens 221 is exposed on the right receiver body 2. As illustrated in FIG. 5, in this embodiment, after the user wears the headset, if a direction squarely faced by the eyes is defined as optical axis Y, and a connecting line between the left camera 12 and the right camera 22 is defined as axis X, then the connecting line X between the left camera 12 and the right camera 22 is perpendicular to the optical axes of the eyes, i.e., the mounting directions of the left camera 12 and the right camera 22 are perpendicular to the user's eyes. Namely, the optical axis of the left camera and the optical axis of the right camera are perpendicular (including substantively perpendicular) to the optical axes of the eyes. Preferably, the connecting line between the left camera 12 and the right camera 22 is parallel or coincident with a connecting line between a left earhole and a right earhole of the user. As illustrated in FIG. 5, static or dynamic images within at least 180° field angle in area A at the left side of the user can be shot through the left fish-eye lens 121, and static or dynamic images within at least 180° field angle in area B at the right side of the user can be shot through the right fish-eye lens 221. The data of the images shot by the left camera 12 and the right camera 22 can be transmitted to the external device 5 for an image merging processing, so as to obtain a 360° panoramic image.

The external device 5 may store an image merging algorithm for merging the received images shot by the left and right cameras 22 into a 360° panoramic image. A processor of the external device executes the image merging algorithm to perform the image merging processing on the images shot by the left and right cameras 22, so as to obtain a 360° panoramic image.

In the embodiment of the present disclosure, the button controller 4 on the headset wire 3 may comprise a button controller case, a control panel provided in the button controller case, and one or more buttons connected to the control panel and embedded into the button controller case, such as the buttons to control the external device for audio play, audio pause, volume adjustment, and phone answering, and so on. In another embodiment, the buttons further comprise those controlling volume and on-off of at least one microphone on the headset.

In addition, in another embodiment of the present disclosure, the buttons further comprise a button controlling image shooting by the left and right cameras. For example, by short-pressing a specific button, the left and right cameras may be used for image shooting, and by short-pressing the specific button again, the image shooting may be stopped; while by long-pressing the specific button, the left and right cameras may be used for video shooting and the microphone may be started for sound recording, and by long-pressing the specific button again, the video shooting may be stopped. This example of the button control mode does not limit the present disclosure, and various other button control modes may be set. For example, different functions may be controlled by different buttons, or by difference pressing manners of the same button. In another embodiment of the present disclosure, some buttons may also be replaced with pulleys or sliders.

The wired headset provided in the embodiment of the present disclosure not only has the functions of the conventional headset, such as phone answering and audio playing, but also shoots images within at least 180° field angle through the ultra-wide-angle cameras provided at the outer sides of the two receiver bodies. An image with a field angle of 360° can be obtained by merging the images from the two cameras, thereby completing the function of panoramic photography. Thus, the headset in the embodiment of the present disclosure can serve as a VR image acquiring device. In addition, the headset in the embodiment of the present disclosure can use two microphones to achieve an acoustic transmission effect and eliminate the background sound for noise elimination.

In another embodiment of the present disclosure, the headset for panoramic photography may be further provided with a power supply module (e.g., a battery) for supplying power to components such as the cameras, so as to shoot ultra-wide-angle pictures even there is no connection with the external device. The power supply module is preferably provided in a button control box of the button controller. Preferably, the headset in the embodiment may be further provided with a storage card for storing data shot by the left and right cameras. The storage card may be provided in the button control box, the left receiver body, the right receiver body or other position. In another embodiment of the present disclosure, corresponding position in the headset may be provided with a storage card interface for receiving the storage card and facilitating the plugging of the storage card.

By using the headset having the ultra-wide-angle camera in the embodiment of the present disclosure, it is unnecessary to hand-hold the shooting device for shooting, and the panoramic photography or VR data acquisition can be conveniently done.

Figure 2:
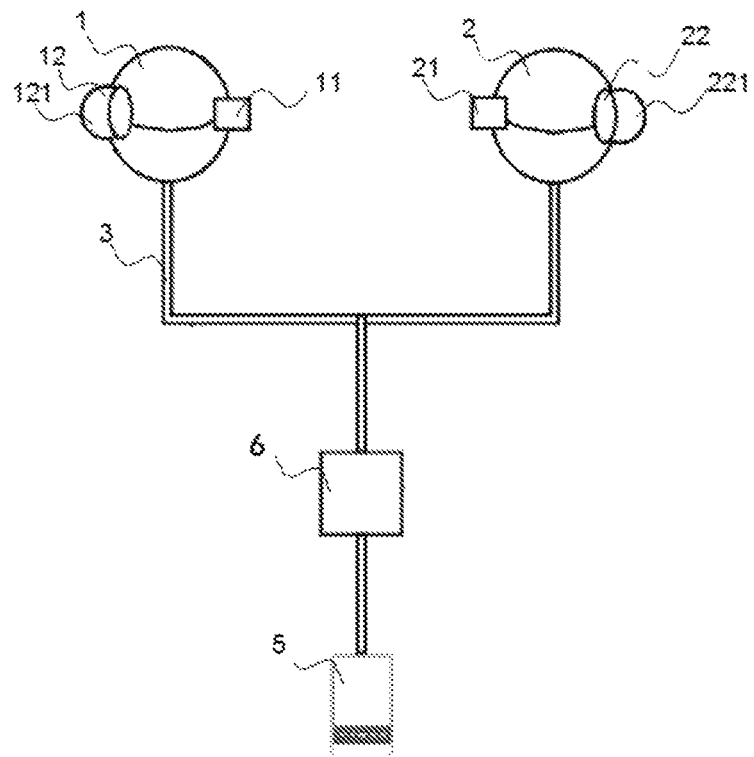
FIG. 2 illustrates a structure of a wired headset for panoramic photography in another embodiment of the present disclosure.

In the embodiment described as above, the images acquired by the left and right cameras are transmitted to the external device and merged therein to obtain a 360° panoramic image. In another embodiment of the present disclosure, the processor for merging the images shot by the left and right cameras to obtain a panoramic image with a field angle of 360° is integrated into the headset, as illustrated in FIG. 2. The structure of the headset for panoramic photography as illustrated in FIG. 2 differs from the structure as illustrated in FIG. 1 in further comprising a processor 6 capable of performing an image merging operation to obtain a panoramic image with a field angle of 360°. In addition, preferably, the button controller may be integrated into the processor 6, thus the button controller 4 is not illustrated in FIG. 2. But the present disclosure is not limited thereto, and the button controller and the processor may also be provided separately. As illustrated in FIG. 2, the left receiver body 1 and the right receiver body 2 are connected to the processor 6 through the headset wire 3, respectively, and the processor 6 is connected to the external device 5.

The left camera 12 has wires in the left receiver body 1, and the right camera 22 has wires in the right receiver body 2, so as to be connected to the processor 6 through the headset wire 3, thereby transmitting the acquired images to the processor 6. By merging the images with a field angle of 180° acquired by the left camera 12 and the right camera 22 in the processor 6, an image with a field angle of 360° can be obtained, thereby achieving a panoramic image.

Figure 6:
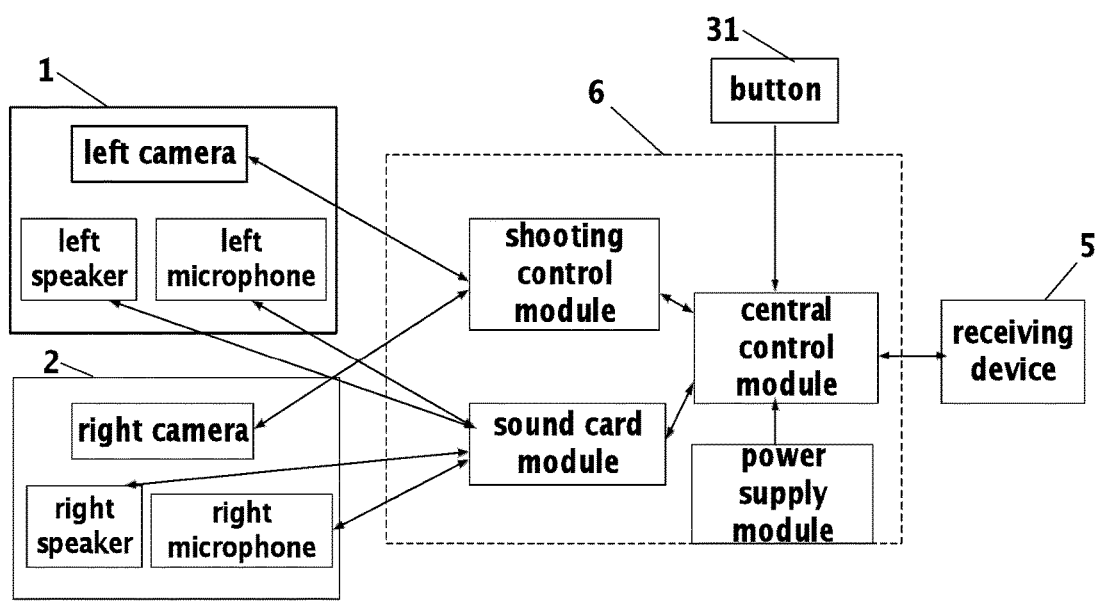
FIG. 6 illustrates a block diagram of a headset for panoramic photography showing a signal transmission in an embodiment of the present disclosure.

Referring to FIG. 6, which illustrates a block diagram of a wired headset for panoramic photography showing s signal transmission in an embodiment of the present disclosure, wherein the processor 6 in FIG. 6 may comprise a central control module, a shooting control module, a sound card module and a power supply module.

A first signal end of the central control module is connected to an output end of a button 31 through the headset wire 3. A second signal end of the central control module is connected to a first signal end of the shooting control module. A second signal end of the shooting control module is connected to the left camera 12 and the right camera 22 through the headset wire 3, respectively. After receiving a short-press signal from a shooting control button, the central control module transmits a control signal to the shooting control module which then controls the left camera 12 and the right camera 22 to shoot images; after receiving a long-press signal from the shooting control button, the central control module transmits a control signal to the shooting control module which then controls the left camera 12 and the right camera 22 to shoot videos.

A third signal end of the central control module is connected to a first signal end of the sound card module; a second signal end of the sound card module is connected to a left speaker and a right speaker through the headset wire 3, respectively; a third signal end of the sound card module is connected to a left microphone and a right microphone through the headset wire 3, respectively. The sound card module transmits a voice signal from the central control module to the left speaker and the right speaker, while transmitting the voice signals output from the left microphone and the right microphone to the central control module.

A fourth signal end of the central control module is connected to the external device 5 such as a cellular phone or a computer, for transmitting the acquired voice and image signals to the cellular phone or a computer, and synthesizing a 360° panoramic image through related algorithms to realize the VR technology.

The power supply module may be connected to the central control module. In addition, the power supply module is provided therein with a battery for supplying power to the central control module, the shooting control module and the sound card module, as well as the external device such as a cellular phone.

As compared with the prior art, the embodiment of the present disclosure provides a camera on the headset, so that the user can easily shoot scenes needing to be shot in the daily behaviors and activities just by wearing the headset. Thus, the user not only listens and speaks with the headset, but also quickly and conveniently shoots images or videos without hand-holding the camera. Further, by shooting within a field angle of 180° at the left and right sides of the human body through the left and right cameras respectively, a 360° panoramic image is obtained by merging the images acquired at the left and right sides within the field angle of 180°, so as to more really simulate the user's image and the VR environment.

The present disclosure solves the problems that the existed ordinary camera cannot acquire the VR image, while also solving the problem that the existed panoramic camera needs to be intentionally hand-held for shooting and is inconvenient. By using the headset provided by the present disclosure, the user can shoot whenever and wherever possible in the daily life, i.e., by wearing the headset, whether or not the user is listening to the music, he can shoot a panoramic image by lightly pressing a button of the headset, and shoot a panoramic video by long-pressing the button, which is arbitrary rather intentional.

Figure 3:
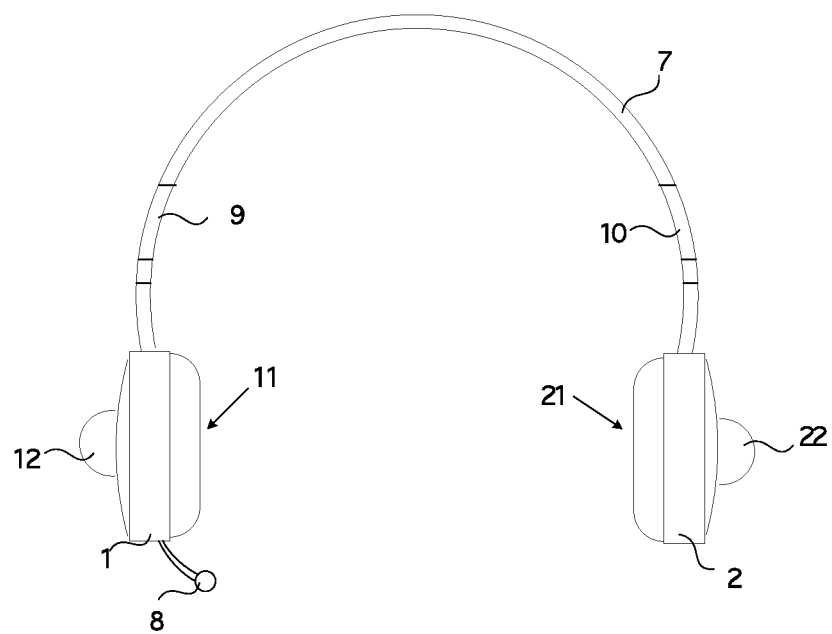
FIG. 3 illustrates a structure of a wireless headset for panoramic photography in still another embodiment of the present disclosure.

The headset for panoramic photography in the present disclosure is not limited to the wired headset, and it also may be a wireless headset. FIG. 3 illustrates a structure of a wireless headset for panoramic photography in still another embodiment of the present disclosure. As illustrated in FIG. 3, the wireless headset for panoramic photography comprises a left receiver body 1, a right receiver body 2, and a support beam 7 connecting the left receiver body 1 with the right receiver body 2. The length of the support beam 7 is variable. For example, the left and right sides of the support beam 7 may be provided with a left extensible member 9 and a right extensible member 10, so as to adjust the length of the support beam. An inner side of the left receiver body 1 is provided with a left play port 11, and the other side of the left receiver body 1 away from the left play port 11 (i.e., an outer side of the left receiver body 1) is provided with a left camera 12. An inner side of the right receiver body 2 is provided with a right play port 21, and the other side on the right receiver body 2 away from the right play port 21 (i.e., an outer side of the right receiver body 2) is provided with a right camera 22. In the embodiment of the present disclosure, both the left camera 12 and the right camera 22 are ultra-wide-angle cameras with a field angle of 180° or more, such as fish-eye cameras, to shoot static or dynamic images within at least 180° field angle at the left and right sides of the user, respectively. In this embodiment, the mounting directions of the left camera 12 and the right camera 22 are also perpendicular (including substantively perpendicular) to the optical axes of the eyes, i.e., the optical axis of the left camera and the optical axis of the right camera are perpendicular (including substantively perpendicular) to the optical axes of the eyes.

As illustrated in FIG. 3, the left receiver body may be provided with a microphone. Alternatively, in an embodiment of the present disclosure, each of the left receiver body and the right receiver body (such as, but not limited to, the positions close to the left camera 12 and the right camera 22) may be provided with a microphone, so as to achieve an acoustic transmission effect and eliminate the background sound for noise elimination.

Figure 7:
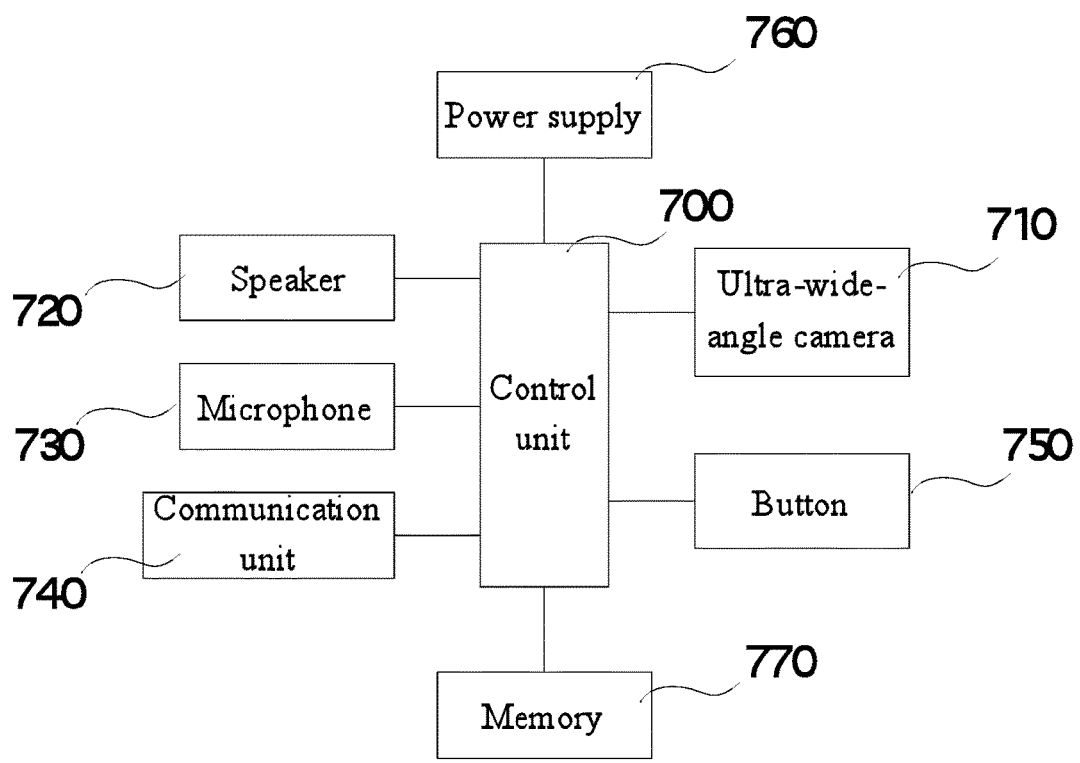
FIG. 7 illustrates a block diagram of a structure of a wireless headset for panoramic photography in another embodiment of the present disclosure.

In addition, the wireless headset in the embodiment of the present disclosure may be further provided with a power supply module, a communication module, at least one button and a control panel, wherein the power supply, the communication module and the control panel may be provided in the case of the headset receiver body (the left receiver body and/or the right receiver body) or the support beam, and the button may be provided on the case of the headset receiver body or the surface of the support beam, but the present disclosure is not limited thereto. The button is configured to execute one or more functions of controlling the external device to use the headset for audio play, audio pause, volume adjustment, phone answering, turning on the microphone, and image shooting by the camera. The power supply module is configured to supply power to various components of the wireless headset. The communication module is configured to communicate with the external device (e.g., cellular phone, tablet computer, notebook computer, desktop computer, etc.). The communication module preferably may comprise a Bluetooth module. In addition, the communication module may further comprise a Wi-Fi module and/or other types of wireless communication modules. The control panel is configured for an overall control of various components of the headset. FIG. 7 illustrates a block diagram of a structure of a wireless headset for panoramic photography in an embodiment of the present disclosure, including some components as illustrated in FIG. 3 and some components provided inside the headset while not illustrated in FIG. 3. The wireless headset in the embodiment as illustrated in FIG. 7 may comprise: ultra-wide-angle cameras 710, a speaker 720, one or two microphones 730, a communication module 740, buttons 750, a power supply 760, a memory 770 and a control panel 700 connected to them. The control panel 700 may control the external device to use the buttons 750 for audio play, audio pause and volume adjustment by the headset, and may turn on the microphone to answer a phone or input voices. The control panel may control the ultra-wide-angle cameras through the button to shoot ultra-wide-angle images, and control the communication module to transmit the images shot by the ultra-wide-angle cameras to the external device, or control the images shot by the ultra-wide-angle cameras to be stored in a memory (e.g., a storage card). The storage card may be provided in the left receiver body, the right receiver body, the support beam or other position on the headset. Correspondingly, the headset may be further provided with a storage card interface for receiving the storage card and facilitating the plugging of the storage card.

In another embodiment of the present disclosure, the wireless headset for panoramic photography may not have the support beam that connects the left and right receiver bodies, but comprise a left headset and a right headset independent from each other, which may be independent Bluetooth headsets. In that case, each of the left headset and the right headset may be provided with a speaker, a microphone, an ultra-wide-angle camera, a control button and a Bluetooth module, wherein the ultra-wide-angle camera is provided at an outer side of the Bluetooth headset, and the optical axis of the ultra-wide-angle camera is perpendicular (including substantially perpendicular) to the optical axes of the eyes. The left headset and the right headset may be used separately or in cooperation, both achieving the conventional Bluetooth headset functions, such as phone answering and audio playing. In addition, an ultra-wide-angle can be obtained. Particularly, when being used in cooperation, the left headset and the right headset can shoot images within at least 180° field angle at the left and right sides of the head, respectively. The left headset and the right headset may transmit the shot images to the external device, which then merges the images from the two cameras to obtain a 360° panoramic image. In another embodiment of the present disclosure, the left headset and the right headset may be provided with a storage card to store data of the shot image.

As can be seen from the above content, the wireless headset provided in the embodiment of the present disclosure not only has the functions of the conventional headset, such as phone answering and audio playing, but also shoots images within at least 180° field angle through the ultra-wide-angle cameras provided at the outer sides of the two receiver bodies. An image with a field angle of 360° can be obtained by merging the images from the two cameras, thereby completing the function of panoramic photography. Thus, the headset in the embodiment of the present disclosure can serve as a VR image acquiring device. In addition, the headset in the embodiment of the present disclosure can employ two microphones to achieve an acoustic transmission effect and eliminate the background sound for noise elimination.

The headsets described in the above embodiments and drawings are just examples, and the headsets in the embodiments of the present disclosure may be of an in-ear type, a head-mounted type, an ear-hook type or other forms. In addition, some functions of the headset may be cancelled or added upon demand.

Features that are described and/or illustrated with respect to one embodiment may be used in the same or similar way in one or more other embodiments, and/or used in combination with or in substitution for the features of other embodiments.

The above specific and detailed descriptions just concern several embodiments of the present disclosure, and should not be understood as limitations to the scope of the invention patent. It should be pointed out that a person skilled in the art can make various modifications and improvements without deviating from the conception of the present disclosure, and those modifications and improvements fall within the protection scope of the present disclosure.

What is claimed is:

1. A headset, comprising a left receiver body and a right receiver body for being respectively mounted on the left ear and the right ear of a user, wherein the left receiver body and the right receiver body are devices that can transmit sound directly into the user's ears, wherein a side of the left receiver body away from the left ear of the user is provided with a left camera, and a side of the right receiver body away from the right ear of the user is provided with a right camera; wherein each of the left camera and the right camera is an ultra-wide-angle camera that individually covers a field angle of 180°, and optical axes of the left camera and the right camera are perpendicular to optical axes of eyes of the user of the headset.

2. The headset according to claim 1, wherein the left camera and the right camera are fish-eye cameras having fish-eye lenses.

3. The headset according to claim 1, wherein,
each of the left receiver body and the right receiver body are provided therein with a speaker; and
a microphone is provided on the left receiver body, or the right receiver body or the headset wire.

4. The headset according to claim 1, wherein,
each of the left receiver body and the right receiver body are provided therein with a speaker; and
a microphone is provided on each of the left receiver body and the right receiver body.

5. The headset according to claim 1, wherein the headset has a headset wire provided with a button controller; the button controller comprises a button controller case, a control panel, and a button connected to the control panel and embedded into the button controller case; the control panel at least controls shooting operations of the left camera and the right camera through the button.

6. The headset according to claim 5, wherein the headset further comprises a processor that comprises a central control module and a shooting control module;
a first signal end of the central control module is connected to an output end of the button; a second signal end of the central control module is connected to a first signal end of the shooting control module; a second signal end of the shooting control module is connected to the left camera and the right camera, respectively; after receiving a short-press signal from the button, the central control module controls the left camera and the right camera to shoot images through the shooting control module; after receiving a long-press signal from the button, the central control module controls the left camera and the right camera to shoot videos through the shooting control module.

7. The headset according to claim 6, wherein the processor further comprises a sound card module; a third signal end of the central control module is connected to a first signal end of the sound card module; a second signal end of the sound card module is connected to speakers of the headset, respectively; a third signal end of the sound card module is connected to a microphone of the headset; the sound card module transmits a voice signal from the central control module to the speakers of the headset, while transmitting voice signals output from the microphones to the central control module.

8. The headset according to claim 1, further comprising:
a communication module configured to communicate with an external device, and transmit data of images shot by the left camera and the right camera to the external device.

9. The headset according to claim 8, wherein,
the communication module comprises a Bluetooth communication module and/or a Wi-Fi communication module.

10. The headset according to claim 8, wherein the headset further comprises at least one control button configured to at least control shooting operations of the left camera and the right camera.

11. The headset according to claim 1, further comprising:
a power supply module configured to at least supply power to the left camera and the right camera.

12. The headset according to claim 1, further comprising:
a storage card configured to store data of images shot by the left camera and the right camera.

* * * * *